May 29, 1951 E. DOBROWSKY 2,554,941
MUSICAL TOY
Filed April 5, 1946 3 Sheets-Sheet 1

INVENTOR.
EMMANUEL DOBROWSKY
BY
Rackenbach & Hirschman
ATTORNEYS

May 29, 1951 E. DOBROWSKY 2,554,941
MUSICAL TOY
Filed April 5, 1946 3 Sheets-Sheet 2
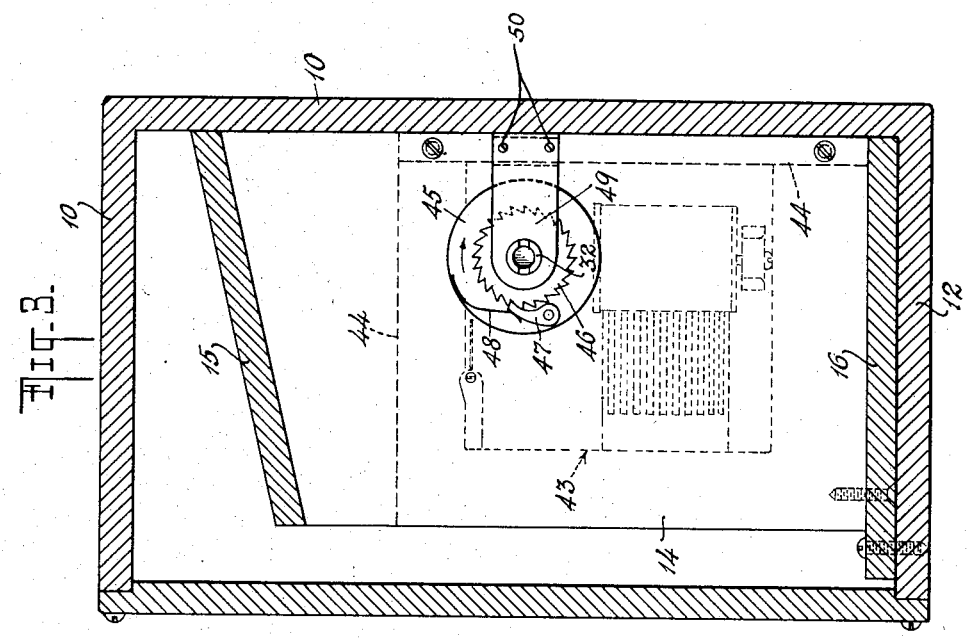
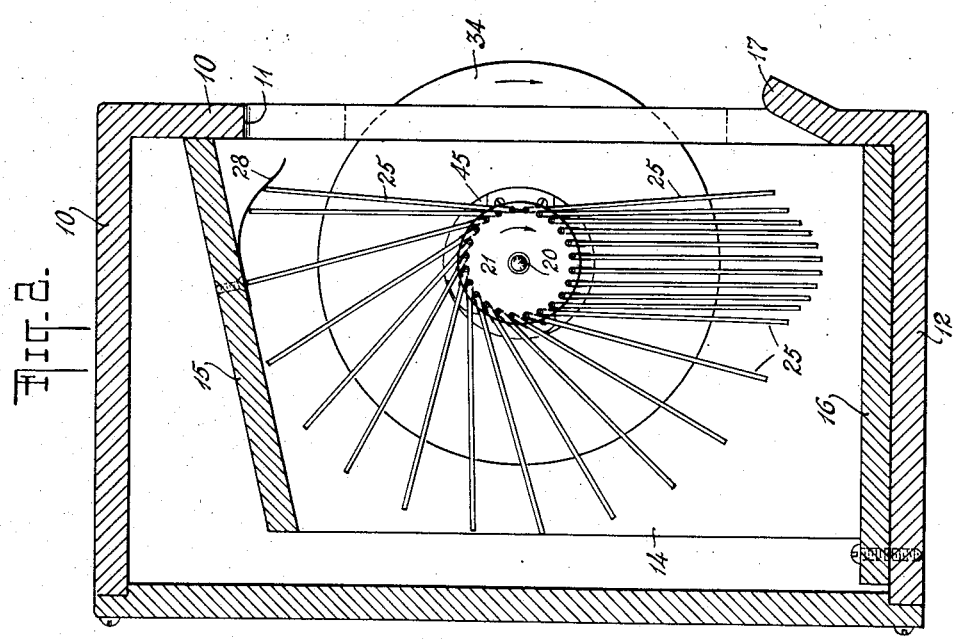
INVENTOR.
EMMANUEL DOBROWSKY
BY
ATTORNEYS May 29, 1951
E. DOBROWSKY
2,554,941
MUSICAL TOY
Filed April 5, 1946
3 Sheets-Sheet 3
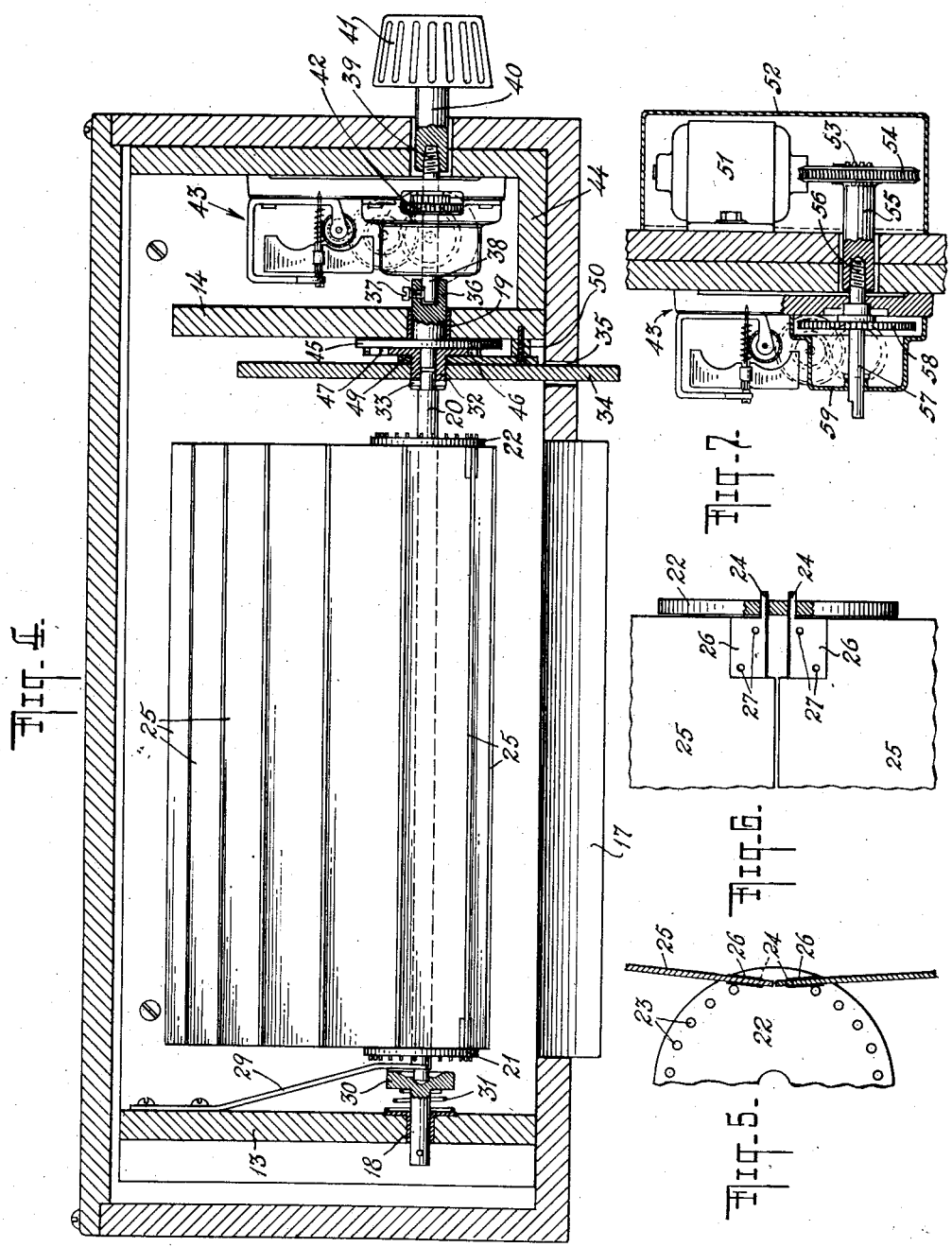
INVENTOR.
EMMANUEL DOBROWSKY
BY
ATTORNEYS Patented May 29, 1951

2,554,941

UNITED STATES PATENT OFFICE 2,554,941

MUSICAL TOY

Emmanuel Dobrowsky, New York, N. Y.

Application April 5, 1946, Serial No. 660,005

1 Claim. (Cl. 40—35)

The invention relates to a musical toy in which a series of pictures, preferably illustrating a story told in a musical composition or a story to which the music is an appropriate accompaniment, is unfolded in a window of a portable case housing the pictures and musical instrument.

An object of the invention is to provide such a construction of a musical toy in which a series of pictures is displayed in an open window of the portable case, in substantial unison with the rendition of a musical composition, the subject matter of which is depicted by the series of pictures.

A further object of the invention is to provide such a musical toy in which illustrative pictures are successively brought into view, as the playing of the music proceeds, with the parts arranged so that two aligned cards, each bearing one-half of the illustration for the action to be depicted, are successively positioned in the window opening of the case to present a single scene in the story or dance routine to which the music is the accompaniment.

A still further object of the invention is to provide such a musical toy device in which the series of cards, illustrative of the action depicted by the musical accompaniment, may be readily removed and replaced by other cards; whereby the musical toy may be operated either by a motor housed within the casing for ready accessibility or by a manually operated mechanism, so that the successive pictures may be brought into view with or without the concurrent operation of the musical instrument.

Still another object of the invention is to secure the simultaneous movement of the illustrative cards with the rendition of the musical accompaniment while preventing the retrograde movement of the illustrative cards.

Other objects of the invention will be apparent to those skilled in the art from the following description of a specific embodiment of my invention.

Such specific embodiment is shown in the accompanying drawing, in which

Fig. 2 is a section on the line 2—2 of Fig. 1;

Fig. 3 is a section on the line 3—3 of Fig. 1;

Fig. 4 is a horizontal sectional view through Feb. 1 approximately on the line 4—4;

Fig. 5 is an enlarged fragmentary view through the cards bearing the illustration, showing the manner of their mounting upon the hub structure secured upon the main rotatable shaft;

Fig. 6 is a side view of the portion of the mechanism illustrated in Fig. 5; and Fig. 7 is an enlarged detail of a modified musical toy in which an electric motor is utilized as the rotatable power source for the illustrating cards, instead of a hand operated knob, and spring actuated motor, as in the main embodiment illustrated.

Figure 1:
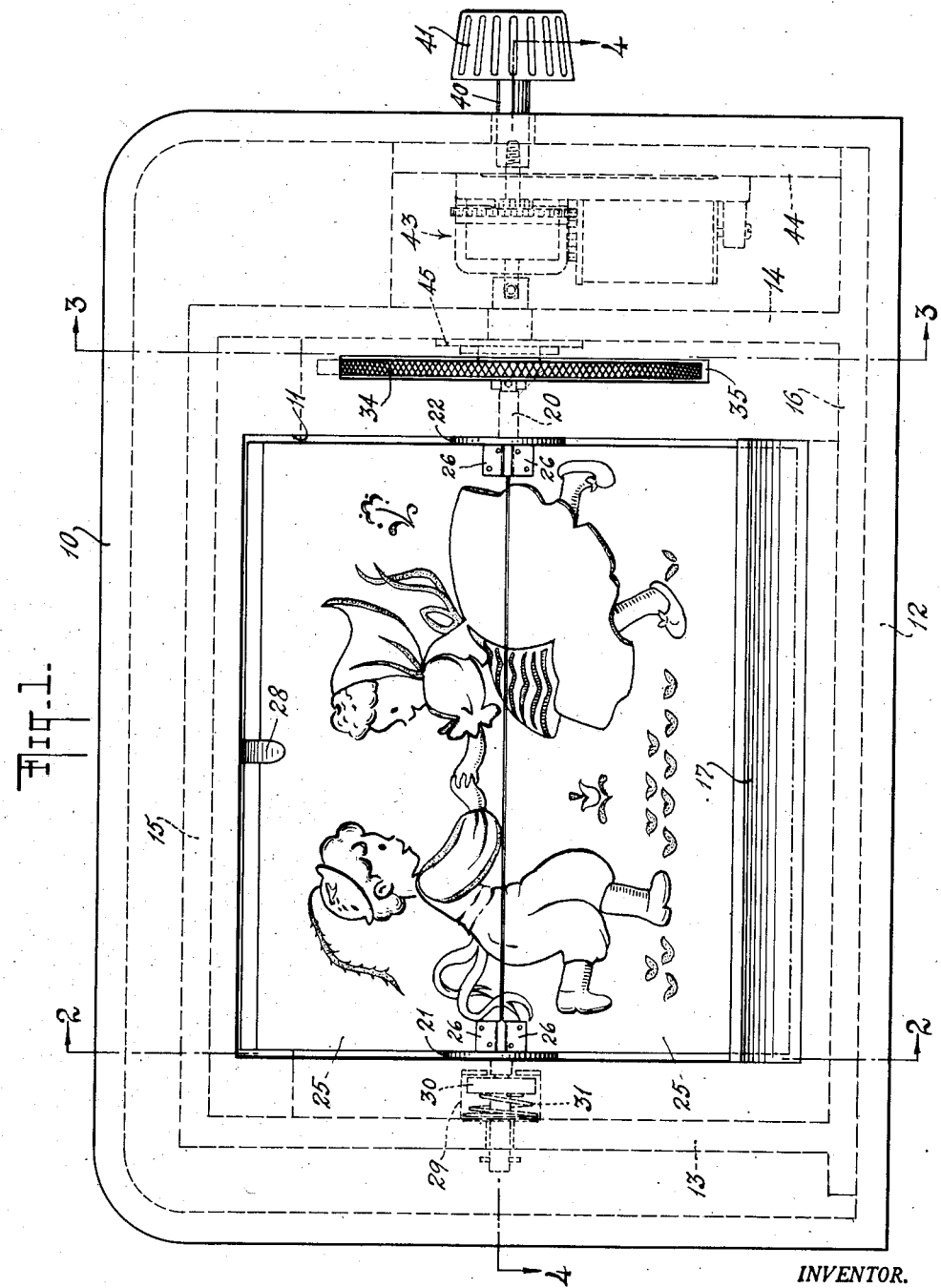
Fig. 1 is a front view of a musical toy showing in the front window thereof a particular pictorial representation of a scene depicted in conjunction with the composition rendered by the musical device.

Referring more particularly to the drawings, in which similar reference characters identify similar parts in the several views, 10 designates a casing of any suitable material, for instance, wood, metal, or plastic and preferably of oblong shape having a large window opening 11 in the front face thereof. Within the casing is arranged the mechanism for bringing into view, within the window, two cards which together carry an illustration of a single scene, with the mechansm of the musical device similarly housed in the case, to one side of the window.

The casing comprises a frame structure having a base 12 to the interior surface of which is secured a base plate 16. Uprights 13 and 14 are secured to the base plate 16 on each side of the window 11, the uprights having slanting upper edges upon which is positioned a slanting roof 15 for the rotating card system. It will be noted that the base 12 has an outwardly and forwardly inclined extension 17 framing the window opening along its bottom edge.

To one side of the housing for the rotating card system, as shown in Fig. 4, in the housing for the musical instrument, the operation of which is controlled through a shaft extending through the housing of such musical instrument, which shaft at the same time, through a knob attached to the end thereof extending outside of the casing, controls the rotation of the card system.

In its general constructional character, the musical toy made in accordance with my present invention is similar to an advertising device as illustrated and described in my Patent No. 2,143,143 dated January 10, 1939. In such patent, I have illustrated and described an advertising device arranged to successively bring into view advertising cards mounted upon a rotating shaft within a casing having a window opening. While I have utilized in my present invention of musical toy certain general features of construction originally described in my aforesaid patent, many changes in the adaptation of the broad principles of said advertising device were necessary in the construction of the musical toy, the subject of the present application, and these details of construction in adapting the principles of my aforesaid advertising device to the musical toy, will be pointed out hereinafter.

The openings in the uprights 13 and 14 through which the members of the structure pass are provided with suitable bearings 18 and 19. These bearings may take the form of a bushing as the bearing 18, indirectly supporting one end of the rotatable shaft 20, and at the opposite end of such shaft the form of a disc having an integral bearing portion 19. Near one end of such shaft there is provided a suitable keyed hub structure 21, a similar hub structure 22 being mounted upon the shaft near its opposite end.

Each of the hub structures 21 and 22 is provided with apertures 23 extending throughout the area near the periphery thereof through which apertures are adapted to be passed, in assembling the card system, the pivoted pins 24 of cards 25. Such cards are preferably made of a sheet material, such as cardboard, which are capable of having printed thereon the parts of the illustration to appear through the window opening 11. Each of the cards 25 is straddled at the lower corners thereof, about which they are to be pivoted, by a small metal hinge 26 from which extend the integral pins 24, the hinge being secured to the cardboard strips by punched indentations 27. As shown particularly in Fig. 6, the metal hinge 26 and pivotal pins 24 integral therewith are set back or inwardly to a slight extent from the inner longitudinal edge of the card, so as to permit proper swinging of the cards upon the hubs 21 and 22 with the adjacent inner longitudinal edges of the two cooperating cards as close together as possible.

Since two of the cards constitute together a single pictorial representation, the line of division between the two sections of the illustration, namely, between two cards, should be as narrow as possible.

In Fig. 2 is illustrated the position of the full complement of illustrations rotatably mounted upon the hub structure 21 with the direction of rotation of the hub shown by an arrow. In such position, two adjacently positioned cards are shown immediately rearwardly of and extending in opposite directions from the central median line of the window opening, with the illustration printed on one of the cards constituting one half of the pictorial representation seen through the window and the corresponding half of the pictorial representation being exposed to view from the reverse surface of the second of the adjacent set of cards.

Upon the rotation of the hub structures 21 and 22, the resilient holding finger 28 is effective to maintain the upper of the two cards in upright position while the lower of the two cards, bearing one half of the illustration, extends downwardly from the hub, being suspended therefrom by gravity. The resilient holding finger 28 is rigidly secured to the slanting roof 15 by a screw. Such holding finger is effective to hold back the upper leaves or cards rotatively positioned upon the hub structure until the forwardly moving card passes the arcuate end portion of the finger, whereupon it will swing downwardly to its lower position, so that the front face of the lower card will be seen through the window. Retrograde movement of the cards is prevented by the abutment of the ends of the cards in their upper position against the slanting roof 15.

To the inner surface of the upright 13 is secured a leaf spring 29 which has a forked lower end straddling a reduced section of the shaft 20, so as to facilitate the removal of the hub and card system from the casing by a slight pressure of the finger of one hand upon the leaf spring 29. Pressure upon the leaf spring 29 will cause the end thereof to exert pressure (see Fig. 4) upon the flange 30 thereby compressing spring 31 and permitting the withdrawal of the shaft and hub structure from the casing by pulling the opposite end of the shaft 20 from the opposite bearing 32 to which it is keyed by key 33. The bearing 32 carries a knurled wheel 34 for manual actuation of the hub structure and shaft, the wheel 34 extending outwardly to the front of the casing through an aperture 35.

Coming now to the description of the mechanism for rotating the hub structure 21 and 22, this is accomplished by rotatable movement of the shaft 20. The shaft 20 is mounted within bearing 32 integral with a ratchet, hereinafter more fully described. Through the upright 14, extends a recessed hub 36 within the recess of which is secured by set screw 37, the end of a shaft 38 having at its opposite end right-handed threading 39 to receive the hub 40 of the knob 41.

The shaft 38 is rotated by a gear 42 of a spring-motor of any conventional form which constitutes, at the same time, the movement mechanism for any conventional musical device generally designated at 43, and including the governor shown.

It will be noted that the musical device 43 is contained in a separate compartment formed by an L-shaped housing to which the musical instrument may be secured in any suitable manner, so that upon the removal of the knob 41 and its shaft 40 by turning the knob 41 to remove it from the right-handed threading, and the removal of the set screw 37, the entire musical instrument may be removed from the toy compartment for repair or substitution of a different musical composition cylinder.

The controlling mechanism for the operation of the toy is shown in greater detail in Fig. 3. Such mechanism constitutes a wheel 45, integral with hub 36 and ratchet 46, which is free of hub 36 but is attached to wheel 34, retrograde movement of which is prevented by pawl 47 held in position by leaf spring 48. The ratchet is supported by a bracket 49 secured by screws 50 to the upright 14.

In Fig. 7 I have illustrated substantially the same musical instrument mechanism but operated by an electric motor 51 which may be suitably mounted upon the casing and encompassed by housing 52. The motor drives a worm 53 which meshes with gear 54 secured to hub 55 screwed into the left hand threading 56 of the shaft 57 which is the counterpart of shaft 38 of the embodiment shown in Fig. 4. The gear 58 in housing 59 operates the musical instrument.

It will be seen that my novel musical toy can be operated for simultaneous showing of the scenes illustrating the musical composition and may be operated to advance the cards independently of the musical rendition by turning the knurled wheel 34. Also, while I have shown power actuated means (both spring-controlled and electric motor) it is obvious that any conventional hand cranking or turning means may be utilized to effect the turning of the card system and operation of the musical instrument.

Also, while I have described specific embodiments of my invention, obviously various changes therein may be made without departing from my invention.

I claim:

A musical toy comprising a casing, a compartment within said casing having a musical composition rendering device mounted therein, a shaft in said compartment and extending through said casing and operating said musical device, a second compartment in said casing, a shaft in said second compartment connected with said first mentioned shaft, a rotating hub structure upon said second mentioned shaft, a plurality of cards, bearing illustrations on each face thereof, mounted for rotation with said hub structure, adjacent pairs of said cards constituting in their vertical position, displaced rearwardly of the front face of said casing, a composite picture formed by the illustration of the rear face on one card and the illustration on the front face of the adjacent card, and means for rotating said hub structure independent of the operation of the musical instrument, said means extending outside of the casing.

EMMANUEL DOBROWSKY.

REFERENCES CITED

The following references are of record in the file of this patent:

UNITED STATES PATENTS

| Number | Name | Date |
| --- | --- | --- |
| 583,679 | Fletcher | June 1, 1897 |
| 2,143,143 | Dobrowsky | Jan. 10, 1939 |